United States Patent [19]
Jörder et al.

[11] Patent Number: 5,534,325
[45] Date of Patent: Jul. 9, 1996

[54] FLAME BARRIER COMPRISING A NONWOVEN FABRIC LAYER CONTAINING PHENOLIC, PARA-ARAMID OR MELAMINE STAPLE FIBERS IN COMBINATION WITH VERMICULITE

[75] Inventors: Kurt Jörder, Weinheim-Heiligkreuz; Werner Schäfer, Birkenau; Hans Hettenbach, Ladenburg, all of Germany

[73] Assignee: Firma Carl Freudenberg, Weinheim, Germany

[21] Appl. No.: 413,737

[22] Filed: Mar. 30, 1995

[51] Int. Cl.$^6$ .............. B32B 3/06; B32B 5/16; B32B 5/02; B32B 5/06

[52] U.S. Cl. .......... 428/102; 428/233; 428/235; 428/240; 428/283; 428/286; 428/300; 428/301; 428/920; 428/921

[58] Field of Search ............ 428/102, 233, 428/235, 240, 283, 286, 300, 301, 920, 921

[56] References Cited

U.S. PATENT DOCUMENTS

| | | | |
|---|---|---|---|
| 4,018,983 | 4/1977 | Pedlow | 174/135 |
| 4,743,495 | 5/1988 | Lilani et al. | 428/234 |
| 4,849,273 | 7/1989 | Skinner et al. | 428/102 |

*Primary Examiner*—James D. Withers
*Attorney, Agent, or Firm*—Kenyon & Kenyon

[57] ABSTRACT

A flame barrier made of nonwoven fabric for use as a component of a planar multilayer structure, especially a vehicle or aircraft passenger seat. The flame barrier contains staple fibers made of phenolic resin, para-aramid, or melamine resin, alone or mixed with 20 to 60 wt % preoxidized polyacrylonitrile staple fibers. The nonwoven fabric barrier also contains 15 to 30 wt % vermiculite, which is distributed through the entire volume of the nonwoven fabric. The flame barrier possesses a mass per unit area of 100 g/m$^2$ to 210 g/m$^2$. The method of manufacturing the nonwoven fabric flame barrier makes use of water jet needling.

6 Claims, No Drawings

FLAME BARRIER COMPRISING A NONWOVEN FABRIC LAYER CONTAINING PHENOLIC, PARA-ARAMID OR MELAMINE STAPLE FIBERS IN COMBINATION WITH VERMICULITE

BACKGROUND OF THE INVENTION

1. Field of the Invention

The invention relates to a flame barrier made of nonwoven fabric for use, e.g., as a component of an automobile or aircraft passenger seat, the seat consisting of a back surface of a foam, the flame barrier, and, on the visible side, a top material.

2. Description of Related Art

Automobile and aircraft passenger seats are suitable for installation in public conveyances on water, on land, and in the air. Aircraft passenger seats, in particular, are subject to strict regulations in terms of fire characteristics.

U.S. Pat. No. 5,279,878 (Föttinger et al.) describes a flame barrier made of nonwoven fabric as a component of a planar multilayer structure, for example a seat. Despite its efficiency according to standards ISO 8191-1 and 8191-2, it has a weight per unit area of no more than 100 g/m² down to 40 g/m², and possesses a textile drape, wear comfort, and good formability. Its thickness is a maximum of 1.8 mm, and its strength at least 10N/5 cm.

These properties are achieved by the fact that the nonwoven fabric consists of partially graphitized polyacrylonitrile fibers with an LOI value of at least 40; that it is bonded with water jets at a pressure of 10,000 kPa to 14,000 kPa; that its fibers have no flameproof impregnation; and that it additionally contains reinforcing elements, incorporated in a warpwise/weftwise arrangement, in a proportion of 12 to 60 g/m².

Exemplary applications for this flame barrier are low-flammability garments, interior fittings of the passenger area of air, land, and waterborne vehicles, engine compartment interior linings, upholstery materials, textile interior furnishings, cushions, and mattresses.

However, flame barriers of this type do not satisfy the terms of the aircraft industry's requirements for aircraft passenger seats, as set forth in FAR 25.853 (b), Amendment 25 to 59. Compliance with this regulation of the Federal Aviation Administration, Department of Transportation, is tested and verified on a simplified seat structure: a seat cushion and back cushion are constructed horizontally and vertically with all the upholstery materials representing the seat (foam core, filler material, fire blocker, seat covering fabric, seams). A flame is applied to this seat structure for two minutes using an oil torch. Flame temperature is 1038° C. Test criteria are a maximum weight loss of 10% during the test period, and maximum flame lengths, as measured from the edges, of 17 inches (432 mm). Flame energy is 119 kW/m², and flame distance is 102 mm.

SUMMARY OF THE INVENTION

The object of the invention is to provide a flame barrier made of nonwoven fabric, and the manufacture thereof, which meets the requirements of FAR 25.853 (b), Amendment 25 to 59.

DETAILED DESCRIPTION OF THE INVENTION

This object of the invention is achieved by a flame barrier made of nonwoven fabric with the following characteristics: The mass per unit area of the flame barrier is 100 g/m² to 210 g/m², and it is composed at least of a) staple fibers made of phenolic resin, para-aramid, or melamine resin, alone or mixed with 20 to 60 wt % preoxidized polyacrylonitrile staple fibers; and of b) 15 to 30 wt % vermiculite. The latter vermiculite component is distributed through the entire volume of the nonwoven fabric, in the form of flake-like platelets, in such a way that when the nonwoven fabric is looked at from above in its cross-sectional direction, complete surface coverage with these vermiculite particles is just precisely guaranteed in the totality of all its cross-sectional planes.

The latter characteristic is important because, on the one hand, this full-area coverage—in overall terms only—prevents flames from penetrating in the cross-sectional direction. On the other hand, the vermiculite proportion is not to be elevated more than necessary, so as not to impede flexibility and air permeability between the individual fibers, and in order to save material costs and weight, which is absolutely essential in aircraft design.

As stated above, the admixture of the less burnthrough-proof, but also flameproof, preoxidized polyacrylonitrile staple fibers is optional. The admixture of these fibers does somewhat reduce the burnthrough resistance efficiency of the flame barrier, but within the indicated limits it is guaranteed that FAR 25.853 (b) will still be met. With this feature of the invention, the proportion of the more expensive fibers in group a) can therefore be reduced.

Good mechanical strength of the nonwoven fabric can be achieved by means of flameproof reinforcing filaments made of a mixture of para- and meta-aramids. Advantageously, these filaments are anchored in the nonwoven fabric in the form of a tricot weave or as a woven fabric according to U.S. Pat. No. 5,279,878, columns 2–3, lines 62 to 5. Spacing is 4 to 24 per inch in the warp direction, and 4 to 15 per cm in the weft direction. The disclosure of U.S. Pat. No. 5,279,878 is incorporated herein by reference.

In this embodiment of the invention the flame barrier can be incorporated into seats which thus easily pass the "Squirmin' Herman test" commonly used in the aircraft industry for chafing resistance. This test was developed by Boeing Technology Services, U.S.A., and simulates the chafing load placed on seat structure elements (top material, fire blocker) by a passenger. Test duration is 50 hours or 100 hours, and thus corresponds to a real-world utilization of 1.5 or 3 years, respectively.

The flame barrier can also be reinforced by means of a standard industrial glass fiber network of multifilament yarns, often called "glass silk," fastened onto or in it. The network advantageously possesses a mass per unit area of 50 g/m² to 90 g/m². Particularly high flexibility of the composite material is achieved with this variant. It also passes the "Squirmin' Herman test."

The manufacturing method of the invention is characterized by the fact that staple fibers made of phenolic resin, para-aramid, or melamine resin, alone or in admixture with 20 to 60 wt % preoxidized polyacrylonitrile staple fibers, are laid as webs on a water-permeable, horizontally movable surface, for example an endless conveyor belt, and needled in a manner known in the art, for example as described in U.S. Pat. No. 5,279,878 (column 2, lines 49–53, and Examples) with high-energy water jets. Sufficient numbers of fiber webs are superimposed and bonded together to produce a nonwoven fabric with the desired mass per unit area, taking into account the impregnation of the nonwoven fabric, occurring after needling, with an aqueous 7.5-vol % dispersion of vermiculite. This impregnation preferably occurs in the foulard.

Impregnation is followed by squeezing out of the water, and then drying in a cylinder or flat belt dryer. The flake-like vermiculite particles are uniformly deposited in planar fashion on the nonwoven fabric fibers, at a proportion of from 25 g/m² to 35 g/m². The overall distribution of the vermiculite particles within the volume of the nonwoven fabric is such that the sum of all cross-sectional planes just guarantees complete coverage of the surface with vermiculite platelets. Preliminary tests utilizing SEM images quickly and easily indicate the squeezing pressure at which to operate in each case, in order for enough vermiculite particles to remain behind in the nonwoven fabric.

If reinforcement with reinforcing filaments is desired, flameproof reinforcing filaments of this kind consisting of a mixture of para- and meta-aramids are incorporated into the nonwoven fabric after needling, using stitch-bonding techniques known in the art, in a proportion of 4 to 24 per inch in the warp direction, and from 4 to 15 per cm in the weft direction. It is advantageous to proceed as in U.S. Pat. No. 5,279,878, Example 2, but reinforcement can also occur in the form of a tricot weave. Impregnation with vermiculite dispersion then occurs.

If a glass fiber network is to be used for reinforcement, this can take place during water-jet needling; the network can be positioned either on or between the fiber webs, the latter method during laying of the webs.

The nonwoven fabric according to the invention is suitable as a flame barrier component not only of aircraft passenger seats, but of course also of seats in other public conveyances on water and on land.

EXAMPLE 1

In an ordinary structure of the seating surface and back of a seat made of a polyurethane cold foam, the flame barrier according to the invention made of nonwoven fabric, and wool/polyamide woven fabric as the seat and back cover, the flame barrier consisted of a fiber nonwoven fabric made of 40 wt % preoxidized polyacrylonitrile fibers and 15 wt % phenolic fibers, a glass fiber network (type SSA-3636 of Glasseiden GmbH, Oschatz, Germany) having been additionally incorporated into the nonwoven fabric at 30 wt %. Impregnation of the nonwoven fabric with vermiculite accounted for 15 wt %. The entire flat formed element, provided with the flame barrier weighing 200 g/m², was subjected to a test according to FAR 25.853 (b), Amendment 25 to 59. A weight loss averaging only 3% of the original weight resulted. The average flame length was 193 mm.

EXAMPLE 2

A fiber nonwoven fabric made of 42 wt % preoxidized polyacrylonitrile fibers, 21 wt % phenolic fibers, and a reinforcement made of 21 wt % meta- and para-aramid yarn in a tricot weave (4.5 yarns per inch in the warp direction) was tested. The nonwoven fabric was impregnated with 16 wt % vermiculite. The weight of this flame barrier was 185 gm/m².

This flame barrier was applied to a seat and back cushion made of polyurethane cold foam, and covered with a cover material made of 90 wt % wool and 10 wt % polyamide woven fabric.

The test under FAR 25.853 (b) resulted, after flame application, in a weight loss of only 2.5 to 3% of the original weight. The average flame length was 202 mm.

Squirmin' Herman Test

The flat formed elements characterized in Example 1 and Example 2 were also tested for resistance to chafing, using the "Squirmin' Herman test." The cushions tested were 445 mm×500 mm×100 mm in size. The surface finish of the test material was checked every 25 hours. It was found that in both the sample according to Example 1 and the one according to Example 2, no significant damage to the barrier occurred even after 100 hours of stress:

No large holes

No fiber breakage

No separation of fibers

No fracture lines in the surface

No fiber pilling

What is claimed is:

1. A nonwoven fabric flame barrier for use as a component of a planar multilayer structure, especially a vehicle or aircraft passenger seat, containing flameproof fibers, the barrier comprising:

a) phenolic, para-aramid or melamine staple fibers, and b) 15 to 30 wt % vermiculite, distributed through the entire volume of the nonwoven fabric in such a way that when the nonwoven fabric is viewed from above in its cross-sectional direction, complete surface coverage with the vermiculite particles is exhibited in all cross-sectional planes of the nonwoven fabric, wherein the nonwoven fabric flame barrier has a mass per unit area of 100 g/m² to 210 g/m².

2. The nonwoven fabric flame barrier according to claim 1 further comprising 20 to 60 wt % preoxidized polyacrylonitrile staple fibers admixed with the phenolic, para-aramid or melamine staple fibers.

3. The flame barrier according to claim 1, further comprising flameproof reinforcing filaments, comprising a mixture of para- and meta-aramid filaments, said filaments anchored by means of a tricot stitch to the nonwoven fabric at a spacing of 4 to 24 per inch in the warp direction and 4 to 15 per cm in the weft direction.

4. The flame barrier according to claim 2, further comprising flameproof reinforcing filaments, comprising a mixture of para- and meta-aramid filaments, said filaments anchored by means of a tricot stitch to the nonwoven fabric at a spacing of 4 to 24 per inch in the warp direction and 4 to 15 per cm in the weft direction.

5. The flame barrier according to claim 1, further comprising a glass fiber network made of multifilament yarn, anchored to the nonwoven fabric of staple fibers, the network having a mass per unit area of 50 g/m² to 90 g/m².

6. The flame barrier according to claim 2, further comprising a glass fiber network made of multifilament yarn, anchored to the nonwoven fabric of staple fibers, the network having a mass per unit area of 50 g/m² to 90 g/m². unit area of 100 g/m² to 210 g/m².

* * * * *

UNITED STATES PATENT AND TRADEMARK OFFICE
CERTIFICATE OF CORRECTION

PATENT NO.  : 5,534,325
DATED       : July 9, 1996
INVENTOR(S) : Hurt Jorder, et. al.

It is certified that error appears in the above-indentified patent and that said Letters Patent is hereby corrected as shown below:

Column 4, lines 62-63, delete "unit area of 100 g/m$^2$ to 210 g/m$^2$.".

Signed and Sealed this

Twenty-sixth Day of November 1996

Attest:

BRUCE LEHMAN

*Attesting Officer*      *Commissioner of Patents and Trademarks*